July 2, 1963 L. P. THOMAS, JR 3,096,399

TELEVISION RECEIVER CIRCUITS

Filed Dec. 30, 1960

INVENTOR.
Lucius P. Thomas, Jr.
BY
ATTORNEY

United States Patent Office 3,096,399

Patented July 2, 1963

3,096,399

TELEVISION RECEIVER CIRCUITS

Lucius P. Thomas, Jr., Woodcrest, N.J., assignor to Radio Corporation of America, a corporation of Delaware Filed Dec. 30, 1960, Ser. No. 79,853
3 Claims. (Cl. 178—7.5)

Figures 1, 2:
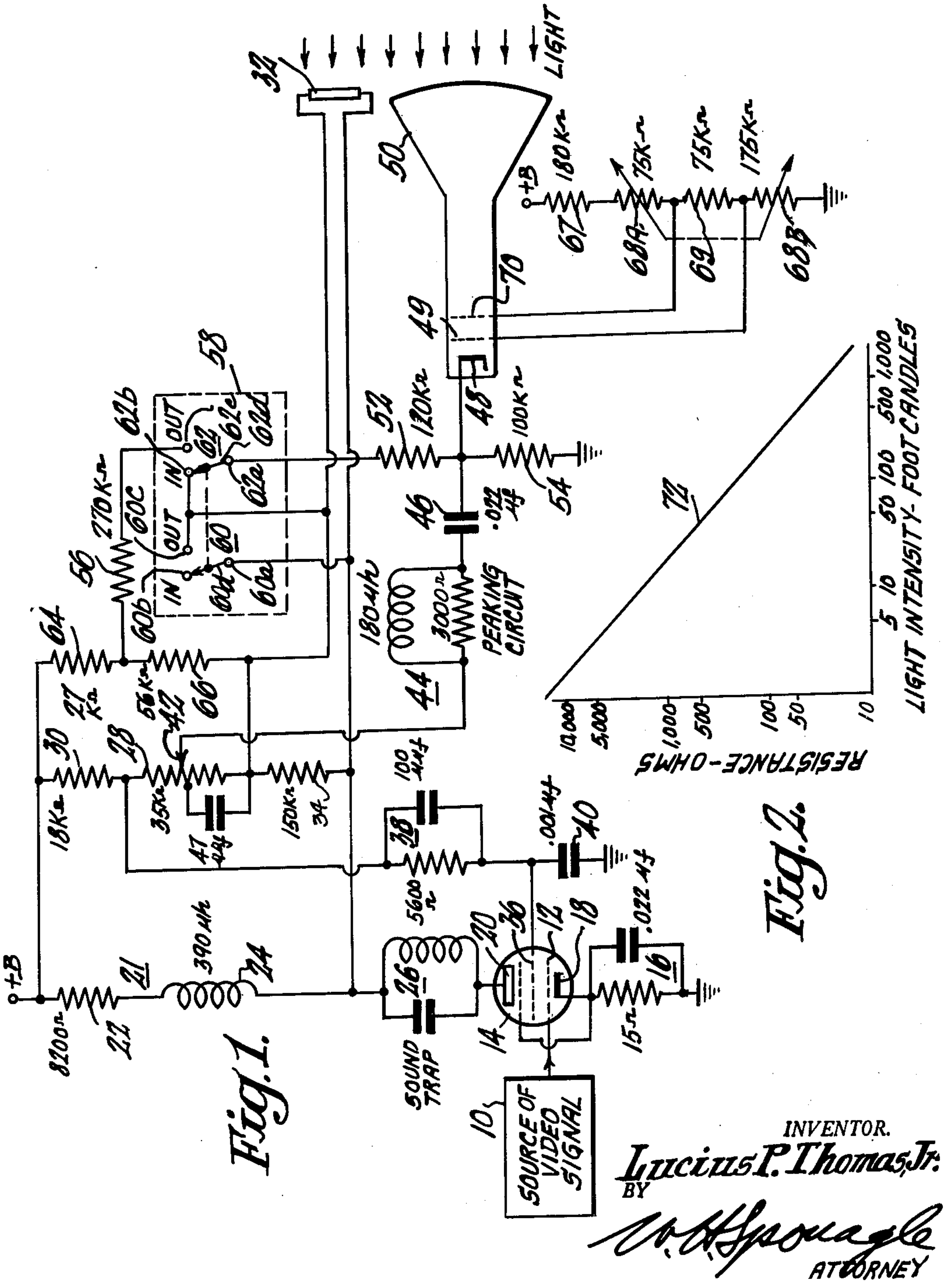

This invention relates to television receiver circuits, and more particularly to circuits for automatically controlling the contrast and brightness of an image reproduced on a cathode ray tube in accordance with the level of light near the viewing surface of the receiver.

When the image on the face of a cathode ray tube is viewed under varying levels of illumination by outside light sources, contrast and brightness settings of the receiver which are suitable for one light condition may not be suitable for another light condition. For instance, an image that may have acceptable contrast and brightness with low ambient illumination on the tube face, may appear to be "washed out" (too little brightness and contrast) with greater ambient illumination on the face. It may therefore be necessary for the viewer to adjust manually the brightness or contrast, or both with changing light conditions to restore an acceptable brightness and contrast to the image. The problem becomes more important as the popularity of portable television receivers increases, since these receivers may be used under widely varying light levels.

It is therefore an object of this invention to provide an improved automatic contrast and brightness control for television receivers.

It is another object of this invention to provide improved circuitry for television receivers for automatically controlling the brightness and contrast of the reproduced image on the cathode ray tube of the receiver in accordance with the ambient light level near the viewing surface of the tube.

These and other objects of the invention are achieved briefly, by providing coupling circuitry between the video amplifier and the image reproducing cathode ray tube of a television receiver which simultaneously varies both the amount of video signal coupled to the cathode ray tube and the brightness voltage of the tube in accordance with the ambient light level near the viewing surface of the tube as sensed by a light responsive element.

The invention may be more fully understood when the following detailed description is read in connection with the accompanying drawing, in which:

FIGURE 1 is a schematic circuit diagram of a portion of a television receiver having an automatic brightness and contrast control in accordance with the invention; and, FIGURE 2 is a graph illustrating certain operational characteristics of a component utilized in the circuit of FIGURE 1.

FIGURE 1 shows a portion of a television receiver and includes a source of video signal 10 for supplying a composite video signal to the control grid 12 of a video amplifier tube 14. The source of composite video signal 10 may be the video detector of a conventional television receiver, and the circuitry associated with the video amplifier tube 14 may be similar to that well known and conventional in the television receiver art.

In the particular circuit illustrated, cathode bias is provided for the tube 14 by a resistor-capacitor network 16 connected between its cathode 18 and ground, or plane of reference potential, for the receiver. The anode 20 of the tube 14 is connected to a source of operating potential, +B, through an inductor-capacitor intercarrier sound trap 26 in series with a video load circuit 21, comprising a video load resistor 22 serially connected with a high frequency peaking coil 24.

The composite video signal applied to the control grid 12 is amplified through the tube 14 and developed across the video load circuit 21. As is known, in present day television receivers the intercarrier sound system is generally used, and the 4.5 mc. intercarrier signal, which is frequency modulated with the sound information, is contained in the video signal. In the circuit shown, the intercarrier sound signal is developed across the sound trap 26 and substantially eliminated from the video load circuit 21.

A contrast control potentiometer 28 is connected across the video load circuit 21, with one terminal of the potentiometer 28 connected through a limit resistor 30 to the junction of the video load resistor 22 and the source of operating potential, +B, and the other terminal connected through a light responsive resistor 32 to the junction of the peaking coil 24 and the sound trap 26. The light responsive resistor 32, as will be more fully explained hereinafter, exhibits a resistance value that varies with the intensity of light striking it. A resistor 34 is shunted across the light responsive resistor 32 and serves to vary the range of resistance values of the combination of the resistor 34 and the light responsive resistor 32, as will be more fully explained hereinafter.

The screen electrode 36 of the video amplifier tube 14 is supplied with operating potential through a resistance-capacitance network 38 connected between the screen 36 and the junction of the potentiometer 28 and the limit resistor 30. The screen 36 is also by-passed to ground for video frequencies by a by-pass capacitor 40.

At least a portion of video signal that is developed across the video load circuit 21 appears across the contrast control potentiometer 28 and is applied from a tap 42 on the potentiometer 28 through a high frequency peaking circuit 44 and a coupling capacitor 46 to the cathode 48 of a cathode ray image reproducing tube 50.

The control grid 49 and the screen grid 70 of the cathode ray tube 50 are connected to a manual brightness control circuit comprising a limit resistor 67, a first brightness potentiometer 68A, second resistor 69, and a second brightness potentiometer 68B connected serially in the order named, across the source of operating potential, +B. The control grid 49 is connected to the junction of the second resistor 69 and the second brightness potentiometer 68B; and the screen grid 70 is connected to the junction of the second resistor 69 and the first brightness potentiometer 68A.

The brightness potentiometers 68A and 68B are of the same value and ganged for unitary operation, so that as one potentiometer (i.e. 68A) is increased in resistance by a given amount, the other (68B) is reduced by the same amount. Thus, the current through the manual brightness control circuit does not change as the potentiometers 68A and 68B are changed, and the voltage drop across the second resistor 69 (and thus the voltage between the grid 49 and screen 70) remains constant. The voltage across the second brightness potentiometer does vary, however, to vary the direct voltage level of the grid 49 and thus the brightness of the image on the cathode ray tube 50. This combined manual, brightness voltage control action on the control grid 49 and screen 70 may be required in a practical circuit to prevent the heater to cathode voltage of the cathode ray tube 50 from exceeding its maximum rated value if the video amplifier tube 14 should fail. The cathode ray tube 50 is supplied with suitable operating and deflection circuits (not shown) which may be of an entirely conventional nature.

The video signal appearing across the video load circuit 21 is developed across the contrast control potentiometer 28 so that the side of the potentiometer 28 connected to the limit resistor 30 is the low signal side. Therefore, moving the tap 42 on the potentiometer 28 toward the limit resistor 30 reduces the amount of video signal applied to the cathode 48 of the cathode ray tube 50 and reduces the contrast of the image reproduced on its face.

In accordance with the invention, the video signal is coupled to the high signal side of the potentiometer 28 through the light responsive resistor 32 which automatically varies, in the manner hereinafter explained, the amount of video signal developed across the potentiometer 28 and the brightness voltage of the cathode ray tube 50 in accordance with the intensity of the ambient light striking it.

The light responsive resistor 32 is connected for operation in the circuit by a double-pole, double-throw switch 58, which includes first and second switch sections 60 and 62, respectively. The switch 58 is a disabling switch for the automatic brightness and contrast control, and may be omitted, if desired. The coupling resistor 56 is also omitted if the switch 58 is not used. The first switch section 60 includes a common terminal 60*a* which is connected to one side of the light responsive resistor 32, at the junction of the light responsive resistor 32 and the potentiometer 28; a first terminal 60*b* which is unconnected; and a second terminal 60*c* which is connected to the opposite side of the light responsive resistor 32. The second switch section 62 includes a common terminal 62*a* which is connected through a first pair of voltage divider resistors 52 and 54 to ground for the receiver; a first terminal 62*b* which is connected to the second terminal 60*c* of the first switch section 60; and a second terminal 62*c* which is connected to a coupling resistor 56. The junction of the first pair of voltage divider resistors 52 and 54 is connected directly to the cathode 48 of the kinescope 50, and the coupling resistor 56 is connected to the junction of a second pair of voltage divider resistors 64 and 66, respectively, which are shunted across the series arrangement of the contrast control potentiometer 28 and limit resistor 30.

Each switch section 60 and 62 includes a movable element 60*d* and 62*d*, respectively, which are ganged for unitary operation. The movable elements 60*d* and 62*d* are shown in the "in" position (connected to the first terminals 60*b* and 62*b*, respectively) to connect the automatic brightness and contrast control circuit for operation. With the movable elements 60*d* and 62*d* switched to the "out" position, the automatic brightness and contrast control circuit is inoperative.

In order to more fully understand the operation of the circuit, assume that the movable elements 60*d* and 62*d* are connected in the "out" position. The common terminal 60*a* of the first switch section 60 is thus connected to the second terminal 60*c* to short-circuit the light responsive resistor 32 and the resistor 34, and couple video signals directly from the anode 20 of the video amplifier tube 14 through the sound trap 26 to the contrast control potentiometer 28. Any variation in resistance that the light responsive resistor 32 might exhibit in response to light variations then has no effect on the circuit. The contrast is controlled only by manual variation of the tap 42 on the potentiometer 28.

Also, with the switch 58 in its "out" position, the common terminal 62*a* of the second switch section 62 is connected to its second terminal 62*c* so that the coupling resistor 56 is connected to the first pair of voltage divider resistors 52 and 54. This connection provides a partial direct coupling of the video signal to the cathode 48 of the cathode ray tube 50. The amount of direct coupling is controlled by selection of the values of the second voltage divider resistors 64 and 66, and can be varied from 0% to 100%.

Assume, now, that the movable elements 60*d* and 62*d* of the switch 58 are connected in the "in" position, with the common terminal 60*a* connected to the first terminal 60*b*, of the first switch section 60, and the common terminal 62*a* connected to the first terminal 62*b* of the second switch section 62. The light responsive resistor 32 is thus connected in series with the contrast control potentiometer 28. The first pair of voltage divider resistors 52 and 54 is now connected to the junction of the light responsive resistor 32 and the potentiometer 28, and the coupling resistor 56 are disconnected from the kinescope cathode 48.

The characteristics of the light responsive resistor 32 are shown in FIGURE 2, in which the curve 72 is a plot on logarithmic scales of the direct current resistance of the light responsive resistor 32 against the intensity of the light incident on it. Under high intensity illumination the resistance of the light responsive resistor 32 is quite small (for instance, at 500 foot-candles of illumination its resistance is approximately 40 ohms while at low intensity illumination its resistance is between 3000 and 4000 ohms). It should be noted that the alternating current resistance of the device, which has not been plotted is somewhat highter than the direct current resistance, and varies in a similar manner with light intensity. A suitable light responsive resistor 32 is available from the Ferroxcube Corporation of America, Saugerties, New York, as "Light Dependent Resistor B8. 731.03."

Thus, under high intensity illumination of the screen of the tube 50 indicated by the arrows on the drawing, when it is necessary to increase the contrast, the resistance of the light responsive resistor 32 is quite low and substantially the entire video signal available at the anode 20 of the video amplifier tube 14 is developed across the contrast control potentiometer 28, and a given setting of the tap 42 on the potentiometer 28 supplies substantially the same actual video signal to the cathode ray tube 50 as if the light responsive resistor 32 were not in the circuit. On the other hand, under low intensity illumination, when a lower contrast is desired, the resistance of the light responsive resistor 32 becomes large and an appreciable portion of the video signal is developed across it, thereby reducing the amount of video signal developed across the contrast control potentiometer 28. This action reduces the amount of video signal applied to the cathode 48 of the tube 50 with any given setting of the tap 42 on the potentiometer 28 and reduces the contrast of image on the face of the tube 50.

Simultaneously with the above described automatic contrast control action, the brightness voltage, at the junction of the first pair of voltage divider resistors 52 and 54, applied to the cathode 48 is also automatically controlled, since these voltage divider resistors are connected through the switch section 62 to the junction of the light responsive resistor 32 and the potentiometer 28.

The end of video load circuit 21 nearest the source of operating potential, +B, is the high direct potential side; and the end nearest the anode 20 of the tube 14 is the low direct potential side. At high levels of illumination, the light responsive resistor 32 has a relatively low resistance and there is little direct voltage drop thereacross. Thus, a relatively low direct potential of the anode 20 of the video amplifier tube 14, is applied through the second switch section 62 and the first pair of voltage divider resistors 52 and 54 to the cathode 48 of the cathode ray tube 50. This results in a high image brightness level, since the bias between fixed voltage control grid 49 and the cathode 48 is relatively low.

At low light intensity levels, however, the resistance of the light responsive resistor 32 increases and the direct voltage drop thereacross increases, making the junction of the potentiometer 28 and the light responsive resistor 32 more positive (nearer in direct potential to the source of operating potential +B). The brightness voltage on the cathode 48 thus becomes more positive, providing a greater bias voltage between grid 49 and cathode 48 and a consequent decreased image brightness level.

In order that the light responsive resistor 32 receive light substantially equal to the light falling on the face of the cathode ray tube 50, the resistor 32 may be mounted through the front wall of the television receiver cabinet. The light responsive resistor 32 carries video signals, however, and it may be desirable to mount it near the video circuits in the interior of the television cabinet. In such a case, a light conducting medium, such as a "Lucite" rod (not shown), may be utilized to conduct light from the front wall of the cabinet to the light responsive resistor 32 located in the interior of the cabinet.

The resistor 34 which shunts the light responsive resistor 32 serves to modify the range of the resistance change of the light responsive resistor 32 so that its range of variation in the resistance values may be controlled to provide the required degree of automatic contrast and brightness control. This resistor 34 is not necessary if the resistance range of the light responsive resistor 32 is satisfactory by itself.

Having thus described the invention, what is claimed is:

1. In a television receiver having a video amplifier electron tube including an anode and further having a cathode ray tube including a cathode, a control grid and an image reproducing face, an automatic image contrast and brightness control circuit comprising in combination, a source of operating potential;

a video load circuit connected between said source of operating potential and the anode of said video amplifier electron tube for developing alternating video signals thereacross;

D.C. coupling means connected in circuit between said video load circuit and the cathode of said cathode ray tube for establishing a direct bias voltage between the cathode and control grid of said cathode ray tube, said D.C. coupling means including a light responsive resistor having a resistance value that varies with the intensity of the light striking it;

A.C. coupling means connected in circuit between said D.C. coupling means and the cathode of said cathode ray tube for passing only said alternating video signals and applying same to said cathode;

and means for applying the light present near the image reproducing face of said cathode ray tube to said light responsive resistor to vary the amplitude of the video signals applied by said A.C. coupling means to said cathode and simultaneously to vary the direct bias voltage between the cathode and the control grid of said cathode ray tube.

2. In a television receiver having a video amplifier electron tube including an anode and further having a cathode ray tube including a cathode, a control grid and an image reproducing face, an automatic image contrast and brightness control circuit comprising, in combination, a source of operating potential;

a video load circuit connected between said source of operating potential and the anode of said video amplifier electron tube for developing alternating video signals thereacross;

D.C. coupling means connected in circuit between said video load circuit and the cathode of said cathode ray tube for establishing a direct bias voltage between the cathode and control grid of said cathode ray tube, said D.C. coupling means including a light responsive resistor having a resistance value that varies with the intensity of the light striking it, said D.C. coupling means further including variable resistive means;

A.C. coupling means connected in circuit between said variable resistive means of said D.C. coupling means and the cathode of said cathode ray tube for passing only said alternating video signals and applying same to said cathode;

and means for applying the light present near the image reproducing face of said cathode ray tube to said light responsive resistor to vary the amplitude of the video signals applied by said A.C. coupling means to said cathode and simultaneously to vary the direct bias voltage between the cathode and the control grid of said cathode ray tube.

3. In a television receiver having a video amplifier electron tube including an anode and further having a cathode ray tube including a cathode, a control grid, a screen grid and an image reproducing face, an automatic image contrast and brightness control circuit comprising, in combination, a source of operating potential;

variable bias means for establishing a relatively fixed voltage on the control grid of said cathode ray tube at any one of a plurality of values while maintaining constant the potential between the control grid and screen grid of said cathode ray tube;

a video load circuit connected between said source of operating potential and the anode of said video amplifier electron tube for developing alternating video signals thereacross;

D.C. coupling means connected in circuit between said video load circuit and the cathode of said cathode ray tube for establishing a direct bias voltage between the cathode and control grid of said cathode ray tube, said D.C. coupling means including a light responsive resistor having a resistance value that varies with the intensity of the light striking it;

A.C. coupling means connected in circuit between said D.C. coupling means and the cathode of said cathode ray tube for passing only said alternating video signals and applying same to said cathode;

and means for applying the light present near the image reproducing face of said cathode ray tube to said light responsive resistor to vary the amplitude of the video signals applied by said A.C. coupling means to said cathode and simultaneously to vary the direct bias voltage between the cathode and the control grid of said cathode ray tube.

References Cited in the file of this patent

UNITED STATES PATENTS 3,027,421 Heijligers ---------------- Mar. 27, 1962

FOREIGN PATENTS 1,076,736 Germany ---------------- Mar. 3, 1960
1,227,937 France ---------------- Aug. 24, 1960